United States Patent [19]

Nakamura et al.

[11] Patent Number: 5,322,537
[45] Date of Patent: Jun. 21, 1994

[54] EXHAUST GAS FILTER AND METHOD FOR MAKING THE SAME

[75] Inventors: Kenichi Nakamura, Settsu; Kunio Kimura, Tsuzuki, both of Japan

[73] Assignee: Matsushita Electric Industrial Co., Ltd., Osaka, Japan

[21] Appl. No.: 53,526

[22] Filed: Apr. 26, 1993

[30] Foreign Application Priority Data

Apr. 28, 1992 [JP] Japan .................. 4-109682

[51] Int. Cl.⁵ .................. B01D 39/20; C04B 38/00
[52] U.S. Cl. .................. 55/523; 55/498; 55/521; 55/DIG. 5; 55/DIG. 30
[58] Field of Search .......... 55/523, DIG. 5, DIG. 10, 55/DIG. 30, 497, 498, 521

[56] References Cited

U.S. PATENT DOCUMENTS

| | | | |
|---|---|---|---|
| 4,340,403 | 7/1982 | Higuchi et al. | 55/DIG. 30 |
| 4,364,761 | 12/1982 | Berg et al. | 55/523 |
| 4,420,316 | 12/1983 | Frost et al. | 55/DIG. 30 |
| 4,652,286 | 3/1987 | Kusuda et al. | 55/523 |
| 4,894,070 | 1/1990 | Keidel et al. | 55/523 X |
| 4,921,616 | 5/1990 | Minjolle | 55/523 X |
| 4,946,487 | 8/1990 | Butkus | 55/523 |
| 5,069,697 | 12/1991 | Hamaguchi et al. | 55/523 |
| 5,098,455 | 3/1992 | Doty et al. | 55/DIG. 30 |
| 5,114,581 | 5/1992 | Goldsmith et al. | 55/523 X |
| 5,177,035 | 1/1993 | Gee et al. | 55/523 X |
| 5,185,018 | 2/1993 | Zievers et al. | 55/523 X |
| 5,194,078 | 3/1993 | Yonemura et al. | 55/523 X |
| 5,194,154 | 3/1993 | Moyer et al. | 55/523 X |
| 5,198,006 | 3/1993 | Mimori et al. | 55/523 |
| 5,198,007 | 3/1993 | Moyer et al. | 55/523 |

FOREIGN PATENT DOCUMENTS 57-187014 11/1982 Japan .................. 55/523

*Primary Examiner*—Robert Spitzer
*Attorney, Agent, or Firm*—Ratner & Prestia

[57] ABSTRACT

An exhaust gas filter for internal combustion engines and having a honeycomb structure comprises a ceramic fiber and an inorganic binder. The ceramic fiber consists essentially of $Al_2O_3$ and $SiO_2$. The inorganic binder includes $Al_2O_3$ and $SiO_2$ to bind the ceramic fiber. The inorganic binder is of a single glass phase or of a mixed phase of a glass phase and a crystal phase both having the same crystal structure in the temperature range of 20° to 1200° C. In the inorganic binder, a crystal such as quartz which produces abnormal expansion due to crystal phase transition is excluded, and occurrence of cracking is prevented.

11 Claims, 2 Drawing Sheets

EXHAUST GAS FILTER AND METHOD FOR MAKING THE SAME

FIELD OF THE INVENTION

This invention relates to an exhaust gas filter of an internal combustion engine, especially a Diesel engine, to clean the exhaust gas emitted by the engine. The filter operates by trapping and removing particulates such as soot exhausted from the engine to prevent air pollution.

BACKGROUND OF THE INVENTION

In recent years, air pollution by NOx or floating small particulates has developed in large cities. As for the small particulates floating in the air, 20 to 30% of them are said to be produced by black smoke exhausted by Diesel engines of automobiles. As a counter-measure against the black smoke, there is provided an exhaust gas cleaner which, placed in the exhausting system, comprises a filter to trap small particulates in the exhaust gas and a refreshing apparatus to burn the trapped particulates.

Among the conventional filters, a ceramic monolithic type is known as is disclosed in U.S. Pat. No. 4,364,761, which is incorporated herein by reference. This conventional ceramic monolithic filter comprises many long cells arranged side-by-side to form a honeycomb structure, one cell having an inlet at one end thereof and being plugged at the other end, and an adjacent cell being plugged at the same end as the inlet of the first cell but having an outlet at the other end. When the exhaust gas enters the inlet and passes along the porous wall between the cells, the particulate in the gas is trapped. If the amount of trapped particulate increases, the porous walls are choked, of course, by the particulates. This results in an increase of back pressure of the engine. Accordingly, it is necessary, when the trapped particulates exceeded a certain amount, to remove the particulates to suppress the load increase on the engine due to increased back pressure. The particulates consist of solid carbon and soluble organic fraction (SOF) which is soluble in an organic solvent such as dichloromethane, both being combustible and burned if heated over 600° C., although the temperature somewhat varies depending upon the kind or loading condition of the engine. Thus, the exhaust gas cleaner is provided with a filter regenerating apparatus such as an electric heater or gas burner. For the exhaust gas filter, it is necessary that it not be choked or molten when heated for regenerating, and, usually is a porous material of large porosity and high melting temperature. For the exhaust gas filter to meet the above described requirement, U.S. Pat. No. 4,652,286 which is incorporated herein by reference discloses a filter which is made by sintering a mixture of silica-alumina fiber and silica-alumina clay at 1200° C. to make a sheet assembled in a honeycomb structure. This filter, however, after repeated particulate trappings and heating regenerating, produced cracks in the wall, and is therefore not satisfactory.

SUMMARY OF THE INVENTION

A gas filter especially for an exhaust gas cleaner of an internal combustion engine is provided which will not crack and which has high durability. An exhaust gas filter comprises a ceramic fiber and an inorganic binder, the ceramic fiber consisting mainly of $Al_2O_3$ and $SiO_2$, the inorganic binder including $Al_2O_3$ and $SiO_2$ to bind the ceramic fiber, and being of a single phase of glass or a mixed phase of a glass phase and a crystal phase which has no crystal transformation in the temperature range of 20° to 1200° C. Such a filter has an inorganic binder which does not include a crystal phase (such as a quartz phase) which has a crystal transformation in the temperature range of 20°–1200° C. Such a crystal phase typically causes abnormal volume expansion or shrinkage as a result of crystal phase transition. Consequently, cracking in the porous wall is suppressed and the duration of the porous wall is improved.

Further, according to an exemplary embodiment of the present invention, a ceramic fiber consisting mainly of alumina and silica is applied with a crystal nucleus of $Cr_2O_3$ etc. With this crystal nucleus, the mullite crystal which generates at the time of sintering is suppressed, and the mechanical strength of the porous wall and the durability of the filter are further improved.

DETAILED DESCRIPTION OF THE INVENTION

Figure 1:
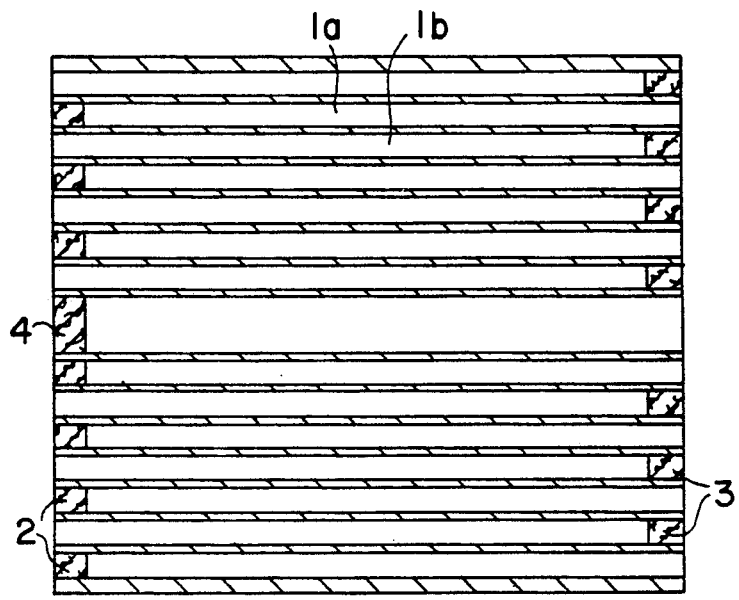
FIG. 1 is a sectional view of an exhaust gas filter embodying an exemplary embodiment of the present invention.

Using the conventional exhaust gas filter with sintered sheets of the mixture of silica-alumina fiber and silica-alumina clay, the present inventors investigated the cause of cracks after cycles of particulates being trapped and heated and found, by thermo-mechanical analysis, an abnormal volume-expansion near 573° C. This is caused by the volume expansion produced by the transformation of quartz, which is a content of the clay in the filter, from low temperature crystal phase to high temperature crystal phase.

As described above, the particulates deposited in the filter are burned out at 600° C. If the exhaust gas filter, when heated for regenerating, had its particulates burned out only partially, the part of the filter with particulates burned out was heated above 600° C., and the part of the filter with particulates not burned was heated below 550° C. Accordingly it was found that, in a wall between a burning path and a not-burning path, the surface of the burning path expands abnormally due to crystal transformation of quartz, and cracks in the wall result.

In some kinds of clays, crystal phases other than quartz such as cristobalite or tridymite were observed. When these crystals are involved, abnormal expansion due to crystal transformation to high temperature crystal phase was noticed in the 150°–230° C. temperature range. This was the reason that cracks occur when exhaust gas near 500° C. flows through an exhaust gas filter under room temperature.

Based on the above investigation of cracking, the present inventors experimented with materials and processes to obtain an exhaust gas filter with excellent durability. The constituent material for exhaust gas filters desirably has high heat-resisting property for burning the particulates. As a typical ceramic fiber of high heat-resisting property, alumina fiber, aluminosilicate fiber, aluminoborosilicate fiber and mullite are known. Among them, alumina fiber and mullite are not appropriate for the exhaust gas filter, since the former is weak against thermal shock or steep temperature gradient due to its big thermal expansion coefficient and the latter is mechanically weak as it is a polycrystal. Thus, the inventors selected alumino-silicate fiber and aluminoborosilicate fiber as the material. Aluminosilicate fiber with $Al_2O_3$ and $SiO_2$ of 50/50 weight % and nominal usable temperature of 1260° C. is marketed. Applying differential thermal analysis to this aluminosilicate fiber, a high heat-generating peak is found in the vicinity of 980° C. This heat-generating peak corresponds to the crystallization peak of mullite crystal ($3Al_2O_3 \cdot 2SiO_2$). Therefore, when aluminosilicate fiber, which is in amorphous state at a normal temperature, is heated mullite crystal nucleus begins to precipitate at a temperature below 950° C., and, in the vicinity of 980° C., the crystal growth reaches a climax. As the weight ratio of $Al_2O_3$ and $SiO_2$ in a mullite crystal is 72:28, aluminosilicate fiber with $Al_2O_3:SiO_2 = 50:50$, at the temperature over 980° C. is of such a state as needle-like crystals of mullite are dispersed in a $SiO_2$-rich aluminosilicate glass. Thus, aluminosilicate fiber after sintering is under such a state. Since the mullite crystals, having no crystal transformation, is stable from room temperature up to 1200° C., the highest temperature expected for the filter, the filter according to the present invention does not have abnormal expansion due to crystal transformation and crack occurrence, if any mullite crystal exists.

The temperature of 1260° C. mentioned above as the temperature aluminosilicate fiber can withstand, is determined based on shrinking of board-type product used as heat-insulating material, and does not limit the sintering temperature for the usage of the present invention. This fiber, in spite of eutectic temperature as high as about 1760° C., has its fibrous structure destroyed at high temperature as a result of viscosity decrease due to its nature as glass. However, it keeps its fibrous structure up to 1600° C. sintering temperature according to observations using an electron microscope, and sintering at a temperature as high as 1600° C. is possible.

Although the existence of mullite crystal does not cause cracking as described above, sintering at high temperature and for long hours induces abnormal growth of crystal particles, and a mechanically strong exhaust gas filter is not obtained. Accordingly, the growth of mullite crystal particle is desirably suppressed. To suppress the growth of needle crystal of mullite, it is enough to have numbers of crystal nuclei increased and the crystal size minimized. As the crystal nucleus, $Cr_2O_3$, $TiO_2$, $ZrO_2$ or such metal oxide which is relatively easily precipitated as crystal from glassy state is preferable.

Aluminosilicate fiber with $Cr_2O_3$ additive and aluminosilicate fiber without any crystal nucleus were applied to differential thermal analysis, and the area of heating peak by the crystallization of the former was confirmed to be far smaller than that of the latter. Also, in electromicrographs of crystal particles after sintering, needle-like crystals of 0.5 μm average length were observed for the aluminosilicate fiber without any additive, but very small crystals only of average length less than 0.1 μm were found for the aluminosilicate fiber with $Cr_2O_3$. Therefore, to suppress the crystal growth of mullite, addition of crystal nucleus, preferably $Cr_2O_3$ is preferable. As for the content of $Cr_2O_3$, 1.5-3 5 weight % is suitable; less than 1.5% is not enough for nucleus suppression, while more than 3.5 weight % results in hard working (i.e. difficulty in corrugating and rolling the ceramic sheet, because the mechanical strength of the sheet is not strong).

The length of the ceramic fiber is preferably within the range of 0.1 to 10 mm. With the length less the strength of the ceramic sheet before sintering is insufficient resulting in hard working, and, with the length more than 10 mm, the fibers overly twist with each other forming large flocks, and unevenness of sheet thickness is greater. In the following, the inorganic binder according to an exemplary embodiment of the present invention is explained. When the aluminosilicate fiber, for example, is adopted as a material for an exhaust gas filter, sufficient strength is not obtained for itself, so that addition of inorganic binder is desirable. Characteristics necessary for the inorganic binder are high heat resistance, low thermal expansion, and reactivity with ceramic fiber, and, accordingly, for that purpose, glass or ceramics consisting mainly of complex oxides $Al_2O_3$ and $SiO_2$ is adequate.

Further to obtaining high adhesive strength without losing the form of the ceramic fiber, use of the inorganic binder with a eutectic or softening temperature lower than that of ceramic fiber is preferable. For that purpose, those containing a small amount of oxide of alkaline metal (Li, NA, K etc.) or alkaline-earth metal (Ca) is preferable. Thus, as the raw material for the inorganic binder, glass of alkaline-metal oxide (alkaline-earth metal oxide)-$SiO_2$-$Al_2O_3$, feldspar such as potash feldspar or plagioclase, or ceramic material consisting mainly of clay mineral such as sericite or illite, or the mixture of those is preferable.

When ceramic material powder of a feldspar or clay mineral, or a mixture of these is adopted as the inorganic binder, sintering at a temperature equal to or higher than the temperature at which a glass phase is formed from the above crystal content will produce a filter material with high mechanical strength. Even if the sintering temperature is equal to or higher than the temperature at which a glass phase is formed, however, the quartz or its modified crystal, cristobalite and tridymite still remains in the inorganic binder after sintering, provided the sintering temperature is relatively low. These crystals have their crystal transformation temperature between the normal temperature and 1200° C., the latter being the highest temperature the filter is used, and the existence of these crystal phases causes cracking. In consequence, according to an exemplary embodiment of the present invention, sintering is carried out at a temperature equal to or higher than that at which the crystal phase of quartz etc. melts into a glass phase. In so doing, the inorganic binder becomes a single phase of glass or a mixed phase of a glass phase and another crystal phase such as of mullite which does not transform below 1200° C., preventing cracking. Further, the glass phase in the inorganic binder becomes silica-rich, resulting in low thermal expansion, improvement of mechanical strength and heat resistance, and thermal-shock resistance of the exhaust gas filter is also obtained. Among material powders containing an alkaline metal or alkaline-earth metal, especially preferable is clay such as sericite consisting mainly of $SiO_2$, $Al_2O_3$ and $K_2O$ and feldspar due to the high durability of the gas filter and easy treatment in manufacturing with an appropriate sintering temperature. If sericite clay, with sericite as the main constituent, and quartz, kaolinite or pyrophyllite as impurities, is sintered at a temperature equal to or higher than 1350° C., the quartz crystal melts into the glass phase, resulting in complete separation to glass and mullite phase, and small thermal expansion coefficient and high mechanical strength with low sintering temperature thanks to the existence of glass phase. For instance, Murakami clay (a natural material marketed by Kyoritsu Ceramic Materials Co., Ltd.) can have its thermal expansion coefficient reduced to $3.6 \times 10^{-6}$ from the conventional $4.5 \times 10^{-6}$ by complete glassifying. Further, with the glass phase becoming silica-rich, the glass transition temperature and yielding point also rises. For example, the yielding temperature rises to 1000° C. from 950° C. for Murakami clay, improving the heat resistance property of the filter.

The temperature at which a quartz crystal melts into the glass phase depends on the composition of the ceramic material powder and especially the content of alkaline metal. For the case of sericite clay, the content of potassium is a big factor for determining the sintering temperature. The Murakami clay, for example, with potassium of about 5 weight % calculated in terms of $K_2O$, is completely separated to mullite phase and glass phase when heated up to or over 1350° C. Generally, the larger the alkaline metal content is, the lower the glassifying temperature is, and the higher the sintering temperature is. For the filter regenerated by heating. burning a high heatshock-resisting property, i.e. a low thermal expansion coefficient, is required, so that the potassium content is preferred to be within a 1.8 to 3.2 weight % range in terms of $K_2O$. However, if the regenerating is made by any method other than heating, the potassium content is not necessarily limited.

The ratio of combining the ceramic fiber and the inorganic binder depends on the porosity necessary for the filter, and is preferred to be 25 to 75 weight % of a ceramic fiber and 25 to 75 weight % of an inorganic binder. If the inorganic binder content is less than 25%, the mechanical strength is insufficient, and if larger than 75% the porosity is not enough.

EMBODIMENT 1

One thousand grams of aluminosilicate fiber (Ibiwool bulk by Ibiden Co., Ltd.) with an average fiber diameter of 3 μm and chopped to 0.1 to 10 mm in length was dispersed in 600 kg water to form a suspension. The suspension was mixed with 1000 g of sericite (Murakami clay) which contains about 5 weight % potassium in terms of $K_2O$ and was stirred, and further mixed and stirred, with 30 g of emulsion of vinyl-acetate and acrylate copolymer. The suspension was then mixed with 100 g of aluminum sulfate and further with an aqueous solution of sodium hydroxide so that the slurry thus made had about 5.5 pH. After adding 200 g of 15% aqueous solution of cationic polyacrylamid to the slurry to form a flock suspension, the suspension was diluted with water to 1500 liters and made into a ceramic paper by a usual papermaking machine. On the other hand, a paste-like plug material was prepared by mixing 2000 g of shattered aluminosilicate fiber, 2000 g of sericite clay, and polyvinyl alcohol.

Figure 2:
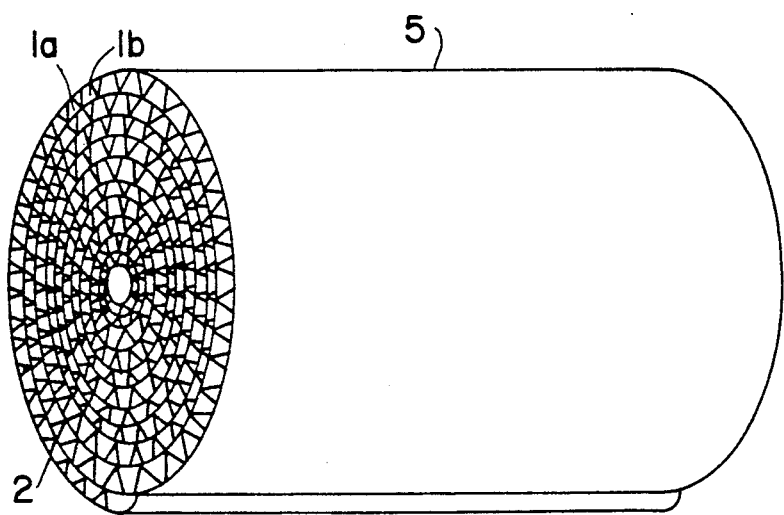
FIG. 2 is a perspective view of the exhaust gas filter shown in FIG. 1.
Figure 3:
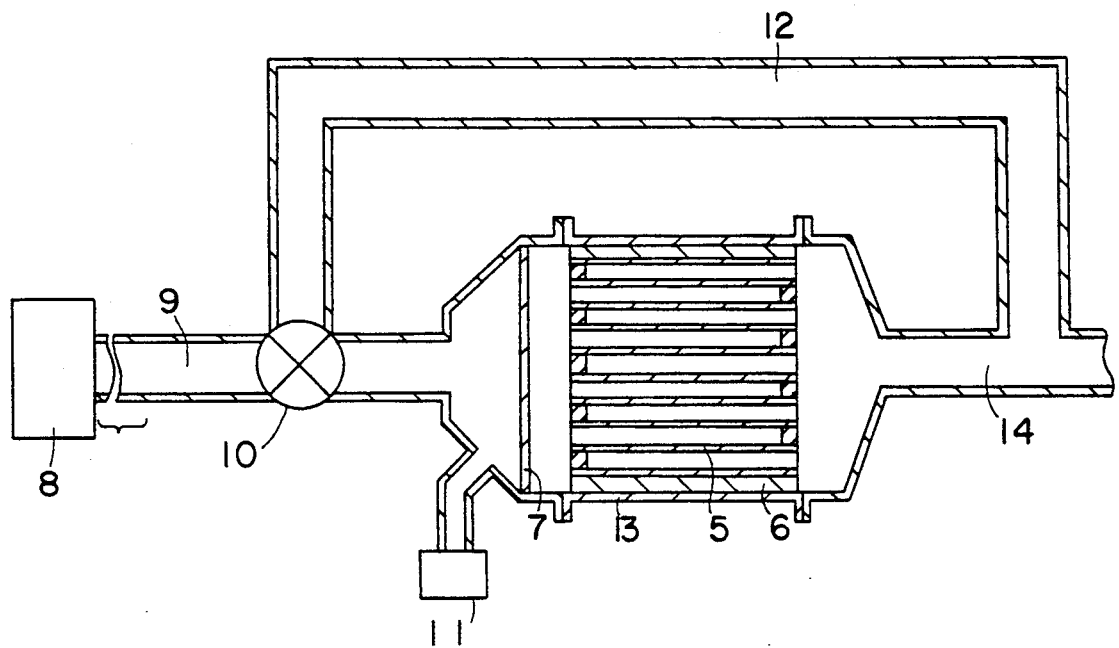
FIG. 3 is a section view showing a system in which an exhaust gas filter is included.

A part of the ceramic paper was made corrugated on a corrugate machine and glued to another part of the paper with adhesive deposited on the peak of corrugation, the adhesive being prepared by kneading 2000 g of aluminosilicate fiber, 2000 g of sericite clay and potato starch. While glueing, an end of the glued corrugated paper is filled with plug material, which, after sintering, becomes the plug 2 in FIG. 1 and FIG. 2. The free peaks of the above glued corrugated sheet were further glued and fixed to another plain sheet, and the thus formed body was rolled and the other end was filled by plug material to become the plug 3. When the rolled up corrugated paper is taken off the rolling machine, the center of the roll occupied by the core becomes empty. The empty center part was filled with plug material, which is to become the core 4 after sintering. The thus assembled body is sintered for 2 hours under 1350° C. temperature. As a result, organic contents disappear and aluminosilicate fibers are consolidated by the glassified sericite clay, and an exhaust gas filter of honeycomb structure of fibrous ceramic having inlets and outlets 1a, 1b for the exhaust gas on one side and on the other side respectively was obtained. The exhaust gas filter 5 was placed in a case 13 of an exhaust gas cleaning apparatus as shown in FIG. 3 with a heat-insulating body 6 consisting of thermally expanding ceramic fiber. For trapping particulate, a valve 10 is fixed to the side of filter 5, whereby the exhaust gas from the engine 8 is, after passing exhaust gas pipe 9, sent to the filter 5. In the filter 5, the particulates in the exhaust gas are trapped, and the exhaust gas without particulates is sent, via an exhaust gas pipe 14, to the outer world or turbocharger. When the trapped particulates exceed a certain amount, the valve 10 is changed to the bypass 12 side, and the regenerating of the filter 5 is carried out. With an electric heater 7 applied with electric power, the exhaust gas filter 5 is heated and the particulates near the entrance of the filter 5 are burned. Then the heater 7 is switched off, and air is sent by an air pump 11, to transfer the flame to the exit of the filter to promote the burning of the particulates. When the burning of particulates is over, the valve 10 is changed to the filter 5, and particulate trapping begins again. An engine 8 was applied with an exhaust gas cleaner with the exhaust gas filter of the present embodiment and was operated for 2 hours, and the increase of back pressure while trapping particulates was found to be 60 mmHg, the same value as the conventional one.

When, after particulate trapping, reheating-regenerating by heater 7 is being made, the particulates burn off at most parts of the exhaust gas filter, but do not at other parts due to heat loss to the outer atmosphere, the temperature difference between the parts being nearly 300° C. While the conventional filter could withstand only about 200° C. temperature difference, the exhaust gas filter according to an exemplary embodiment can withstand as high as a 500° C. temperature difference, due to the mechanical strength increased to two times and the thermal expansion coefficient reduced by more than 20%. Repetition testing of the trapping and heating of particulates proved that the filter is not destroyed even after 200 cycles of trapping and heating. Further, black smoke was not observed after 1000 cycles, showing that the filter is carrying out the duty as a filter up to 1000 cycles.

Instead of the aluminosilicate fiber, aluminoborosilicate fiber can be used.

EMBODIMENT 2

An exhaust gas filter was prepared, with sintering temperature of 1500° C. for the sintering to make a honeycomb structure, instead of 1350° C. of Embodiment 1. Repetition testing of heating-regenerating of this filter as in Embodiment 1 was carried out without destroying of the filter after more than 1000 cycles. Thus, it was found that increasing the sintering temperature brought an increase of mechanical strength of the filter and an increase of the number of times of repeated regenerating.

EMBODIMENT 3

An exhaust gas filter was prepared with aluminosilicate fiber (SC bulk 1400B, Nippon Steel Chemical Co., Ltd) containing 2.5 weight % $Cr_2O_3$ instead of aluminosilicate fiber in Embodiment 1. To verify the crystal-growth suppression effect, differential thermal analysis was applied to the aluminosilicate fiber with $Cr_2O_3$ and the fiber according to Embodiment 1 using differential thermal analyzer DTA911D of Rigaku Corp.

TABLE 1

|  | with $Cr_2O_3$ | without an additive |
|---|---|---|
| Peak temperature of crystallization | 980° C. | 980° C. |
| Peak area of DTA | 10 μV · s/mg | 40 μV · s/mg |

As a result, as shown in Table 1, it was confirmed that the area of heating peak by crystallization of aluminosilicate fiber with $Cr_2O_3$ is far smaller than that of fiber without additive. Also, an electromicrograph of crystal particles after sintering was inspected, and needle-like crystals with more than 0.5 m average length for the fiber without additive were observed. However, for the fiber with $CR_2O_3$ crystals of equal to or less than 0.1 μm average were observed.

The exhaust gas filter prepared as explained above was applied on an exhaust gas cleaning apparatus of FIG. 3. After 2 hours of the engine operation and particulate trapping, the increase of back pressure was 60 mmHg, as for Embodiment 1. Also, repetition of particulate trapping and heating regenerating 1000 times did not bring black smoke. The mechanical strength increased to more than 1.2 times of the filter of Embodiment 1, and increase of duration resulted.

EMBODIMENT 4

To investigate the effect $K_2O$ content in an inorganic material has on the thermal characteristics, physical properties were compared on the five samples of sericite clay with $K_2O$ content 1, 2, 3, 4 and 5 weight % (tolerance of ±0.2% is possible, as natural products) from Shokozan mine, Showa Mining Co., Ltd. whose constituents given by analysis are as shown in Table 2.

TABLE 2

| Sample | Constituents of Samples | | | | |
|---|---|---|---|---|---|
|  | No. 1 | No. 2 | No. 3 | No. 4 | No. 5 |
| Designated $K_2O$ content (%) | 0.8–1.2 | 1.8–2.2 | 2.8–3.2 | 3.8–4.2 | 4.8–5.2 |
| $K_2O$ (%) | 1.2 | 2.0 | 2.9 | 3.9 | 5.1 |
| $SiO_2$ (%) | 88.7 | 80.6 | 70.2 | 60.5 | 65.0 |
| $Al_2O_3$ (%) | 7.1 | 13.8 | 22.3 | 29.8 | 24.8 |
| Ig Loss (%) | 1.6 | 2.8 | 3.8 | 4.7 | 3.8 |

These samples were sintered in an electric furnace for 2 hours at temperatures 1200, 1300, 1400, 1500, and 1600° C., and applied to the thermomechanical analysis (by analyzer TMA8140, Rigaku Corp.), the results being shown in Table 3, wherein the "sintering-possible temperature" means the temperature, after sintering under which temperature only mullite and glass phase remain and quartz and cristobalite disappear.

TABLE 3

| Sample | No. 1 | No. 2 | No. 3 | No. 4 | No. 5 |
|---|---|---|---|---|---|
| Sintering-possible temperature (°C.) | ≧1600 | ≧1500 | ≧1400 | ≧1350 | ≧1300 |
| Thermal expansion coefficient ($10^{-6}$/°C.) | 0.8 | 1.9 | 2.8 | 3.7 | 3.9 |
| Glass transition temperature (°C.) | 1000 | 890 | 880 | 850 | 870 |
| Yielding temperature (°C.) | 1300 | 1150 | 1100 | 1030 | 1010 |

Five kinds of exhaust gas filters were made with 5 kinds of clay of Table 1 as the material powder for inorganic binder, when the quantity of organic binder was so adjusted to the same porosity as obtained for different sintering temperatures peculiar to clays. These 5 kinds of filters were tested, applying on the exhaust gas filter cleaning apparatus and being heated repeatedly under the same conditions, to obtain the number of repetitions until cracking or melting of material occurs. The results are given in Table 4.

TABLE 4

| Clay sample | No. 1 | No. 2 | No. 3 | No. 4 | No. 5 |
|---|---|---|---|---|---|
| $K_2O$ content (%) | 0.8–1.2 | 1.8–2.2 | 2.8–3.2 | 3.8–4.2 | 4.8–5.2 |
| Sintering temperature (°C.) | 1600 | 1500 | 1400 | 1350 | 1300 |
| Cycle of duration | >1000 | >1000 | >1000 | 200 | 10 |

As is observed in Table 4, the lower the $K_2O$ content is, the larger the cycles of duration against heating regenerating are, especially, with $K_2O$ content less than 3.2 weight % duration of more than 1000 cycles is possible. Among the samples, however, the filter from No. 1 clay had its aluminosilicate fiber partially deformed due to the high sintering temperature. Accordingly, the most favorable $K_2O$ content is 1.8 to 3.2 weight %, and the most favorable sintering-temperature is 1400° to 1500° C.

EMBODIMENT 5

Natural sericite clay contains small amounts of clays such as kaolinite, pyrophyllite and quartz as impurities. On samples obtained by adding to 50 weight part of sericite clay with 3.9 weight % $K_2O$ (Showa Mining Co.), 50 weight part of kaolinite (Tsuchiya Kaolin Ind. 5M kaolin), 50 weight part of pyrophyllite (Showa Mining Co.), or silica sand (Tsuchiya, natural silica sand No. 3) to make the $K_2O$ contents with 2.0 weight %, the sintering-possible temperatures were examined. The result is shown in Table 5.

TABLE 5

| Additive | Kaolinite | Pyrophyllite | Silica (quartz) |
|---|---|---|---|
| sintering-possible temperature (°C.) | 1500 | 1500 | not usable |

As is observed, the clays with kaolinite or pyrophyllite can be used under likewise conditions as sericite with 2% $K_2O$. However, the clay with the addition of quartz had much crystallization of cristobalite, could not melt into glass phase, had too large an expansion coefficient, and was not suitable for application. Then, of the three exhaust gas filters obtained by a manufacturing method similar to that described in Embodiment 1, but with the three types of clay of the above described present exemplary embodiment, similar tests of repeated heating were applied. The result is shown in Table 6.

As is indicated, sericite clay with the addition of kaolinite or pyrophyllite to reduce the $K_2O$ content to 1.8-3.2% can work against more than 1000 times of heating regenerating.

TABLE 6

| Additive | Kaolinite | Pyrophyllite | Silica |
|---|---|---|---|
| Sintering temperature (°C.) | 1500 | 1500 | 1500 |
| Duration cycle | >1000 | >1000 | 1 |

What is claimed:

1. An exhaust gas filter comprising:
   a ceramic fiber including $Al_2O_3$ and $SiO_2$, and
   an inorganic binder including $Al_2O_3$ and $SiO_2$ for binding to said ceramic fiber,
   wherein said inorganic binder is of a single phase of glass or of a mixed phase of a glass phase and a crystal phase, said crystal phase having a crystal structure which is invariant in the temperature range of 20° to 1200° C.

2. The exhaust gas filter of claim 1, wherein said ceramic fiber includes one compound selected from the group consisting of aluminosilicate and aluminoborosilicate.

3. The exhaust gas filter of claim 1, wherein said ceramic fiber comprises a crystal nucleus.

4. The exhaust gas filter of claim 3, wherein said crystal nucleus is $Cr_2O_3$.

5. The exhaust gas filter of claim 1, wherein said inorganic binder includes at least one compound selected from the group consisting of alkaline and alkaline earth metals.

6. An exhaust gas filter comprising
   a ceramic fiber including $Al_2O_3$ and $SiO_2$, and
   an inorganic binder which includes complex oxides including $Al_2O_3$, $SiO_2$ and potassium, to bind said ceramic fiber,
   wherein said inorganic binder comprises a mixed phase of a glass phase and a mullite phase.

7. A method of manufacturing an exhaust gas filter comprising the steps of:
   1) preparing a mixture including raw materials of ceramic powder,
   2) manufacturing a honeycomb structure with a porous wall, an inlet for an exhaust gas leading to said porous wall, and an outlet for an exhaust gas after passing through said porous wall from said mixture, and
   3) sintering the honeycomb structure,
   wherein said ceramic raw material powder comprises a ceramic fiber with $Al_2O_3$ and $SiO_2$ as the main constituents, and an inorganic binder material powder comprising complex oxides including $Al_2O_3$, $SiO_2$ and at least oxides from the group consisting of alkaline and alkaline earth metal, and
   wherein the sintering is carried out at a temperature range in which said inorganic binder material powder changes to a single glass phase or to a mixed phase with a crystal phase having a crystal structure which is invariant in the temperature range of 20° to 1200° C.

8. The method of manufacturing an exhaust gas filter of claim 7, wherein said ceramic fiber further contains $Cr_2O_3$ of 1.5 to 3.5 weight %.

9. The method of manufacturing an exhaust gas filter of claim 7, wherein said inorganic binder material powder includes sericite.

10. The method of manufacturing an exhaust gas filter of claim 7, wherein said inorganic binder material powder includes potassium of 1.8 to 3.2 weight % in terms of $K_2O$.

11. A method of manufacturing an exhaust gas filter comprising the steps of:
    1) preparing a mixture including ceramic material powder,
    2) manufacturing a honeycomb structure with a porous wall, an inlet for an exhaust gas leading to said porous wall, and an outlet for an exhaust gas after passing through said porous wall from said mixture, and
    3) sintering the honeycomb structure,
    wherein said mixture includes aluminosilicate fiber, sericite clay, and organic binder, and
    wherein said step of manufacturing a honeycomb structure comprises the steps of making a planar sheet and corrugated sheet with said mixture, gluing said planar sheet to said corrugated sheet so that cavities are formed, pouring paste for plug-forming into said cavities, said paste including aluminosilicate fiber, sericite clay, and organic binder, and combining and winding said planar sheet and said corrugated sheet into a cylindrical form, wherein said sintering is carried out at a temperature range of 1400°-1500° C.

* * * * *